Feb. 4, 1958

F. B. PORTERFIELD ET AL 2,821,908

INTERPRETING AND PRINTING MACHINE

Filed Jan. 19, 1956

INVENTORS
FRED B. PORTERFIELD &
BY   WILLIAM B. JONES their ATTORNEYS

Feb. 4, 1958  F. B. PORTERFIELD ET AL  2,821,908
INTERPRETING AND PRINTING MACHINE
Filed Jan. 19, 1956  4 Sheets-Sheet 2

INVENTORS
FRED B. PORTERFIELD &
WILLIAM B. JONES
BY their ATTORNEYS

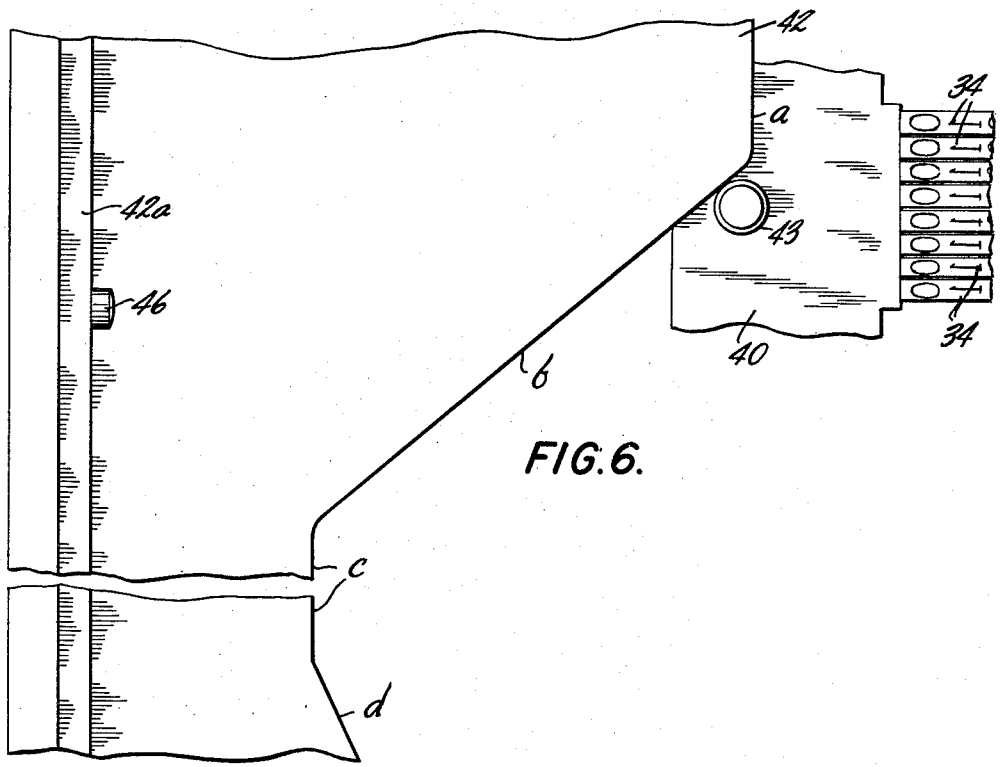
FIG. 6.
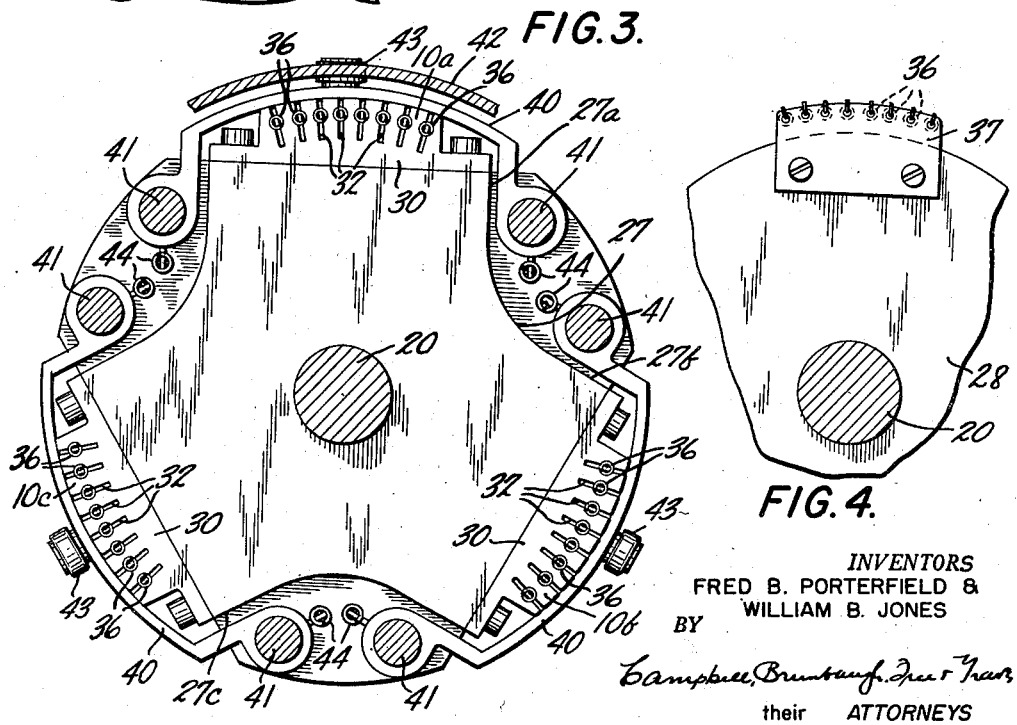
FIG. 3.
FIG. 4.
INVENTORS
FRED B. PORTERFIELD &
WILLIAM B. JONES
BY
their ATTORNEYS

2,821,908

INTERPRETING AND PRINTING MACHINE

Fred B. Porterfield, Vestal, and William B. Jones, Endicott, N. Y., assignors to International Business Machines Corporation, New York, N. Y., a corporation of New York Application January 19, 1956, Serial No. 560,189

18 Claims. (Cl. 101—91)

This invention relates to automatically controlled machines which combine interpreting and printing operations, and more particularly to a machine of that general organization for printing on a carrier, for example, a record card, indicia which corresponds to information represented in code form on the same or a different carrier.

In modern business systems, it has been found convenient to store various kinds of information in code form, such as by perforations, in a record card, and these record cards, in the usual course of their use, are adapted to be handled by business machines. It is sometimes desirable, however, to reproduce the coded information in readable form on the same or a different record card. For example, coded record cards are used as time cards, job cards, or for storing various information regarding a particular employee, and these cards are handled regularly by persons who have the responsibility of recording the information therein. The handling of the cards by these persons is greatly facilitated by marking the employee's identification or other designator in readable form on the face of the card, preferably near the narrow left-hand edge inasmuch as they are often stored in vertical slots or "pigeonholes" with that edge up.

The present invention provides an apparatus which includes a rotary assembly driven continuously at high speed; a plurality of typebars carried by the rotary assembly; each bearing assorted indicia thereon; a sensing unit for reading the information previously recorded in code in a record card, and an interpreting mechanism for translating the information read by the sensing unit into appropriate adjustments of the type bars so that they will print selected indicia on a card fed to the rotary assembly.

It is a feature of the present invention that the interpreting mechanism is operative to translate the information read by the sensing unit into appropriate adjustments of the typebars, notwithstanding the fact that the typebars are carried by a rotary assembly which is driven continuously at high speed. Accordingly, to facilitate the interpreting of the information read by the sensing unit into the appropriate adjustments of the typebars carried by the rotary assembly, a portion of each complete cycle of operation of a bank of typebars, in advance of the portion of the cycle at which the printing operation takes place, is allocated to the adjustment of the typebars under the control of the sensing unit. The timing of the apparatus is such that the coded record card which controls the printing operation is delivered to the sensing unit simultaneously with the arrival of a bank of typebars at the beginning of the portion of the cycle during which the interpretation takes place. As soon as the typebars have arrived at this portion of the cycle, the entire bank thereof begins to move in such fashion that each typebar will advance from one extreme position to another, thereby presenting successively each of the type characters thereon at an operative position, unless the typebar is locked in a selected intermediate position. As the record card is advanced relative to the sensing unit, the code perforations in the control card will actuate locking devices associated with each of the typebars to be utilized in the printing operation, and a line of type comprising the selected indicia of the typebars is thereby set up. At the completion of the interpreting portion of the cycle, the typebars are presented at the printing position simultaneously with the presentation of the card to receive the printing impression from the typebars, and the line of type is printed thereon.

Inasmuch as the interpreting and printing operations are performed by the apparatus of the present invention without stopping or interruption in the speed of operation of the rotary assembly, it is evident that information can be interpreted and printed at great speed on the record cards fed thereto in rapid succession.

For a complete understanding of the present invention, reference may be made to the detailed description which follows and to the accompanying drawings in which.

Figure 9:
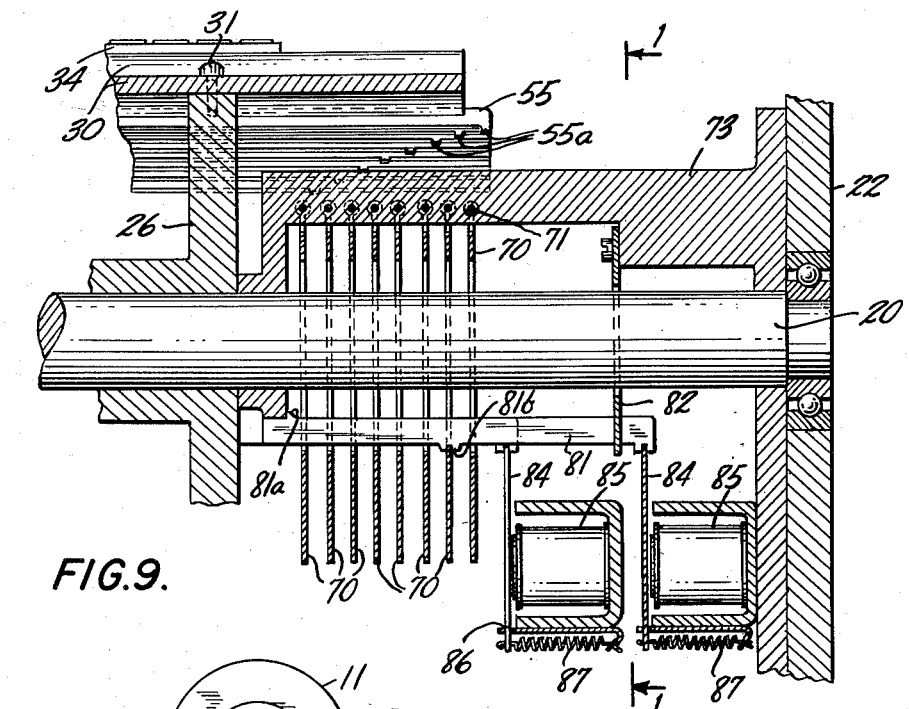
Figure 1:
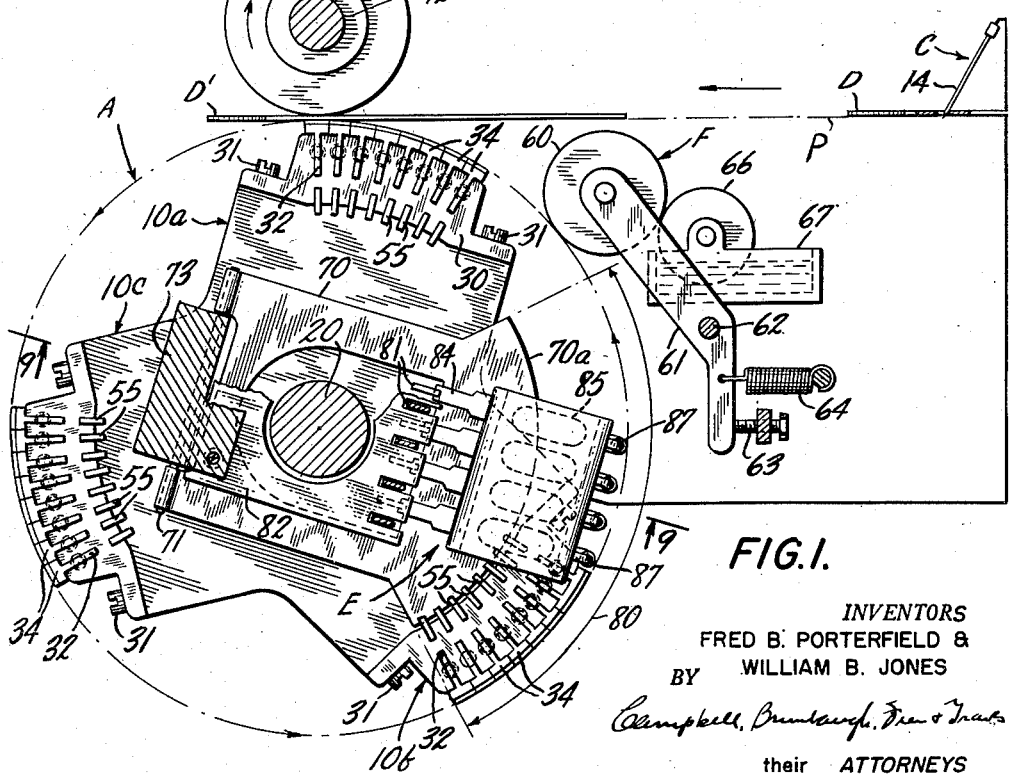
Figure 1 is a cross-section front elevation of the machine with the front frame broken away.
Figure 5:
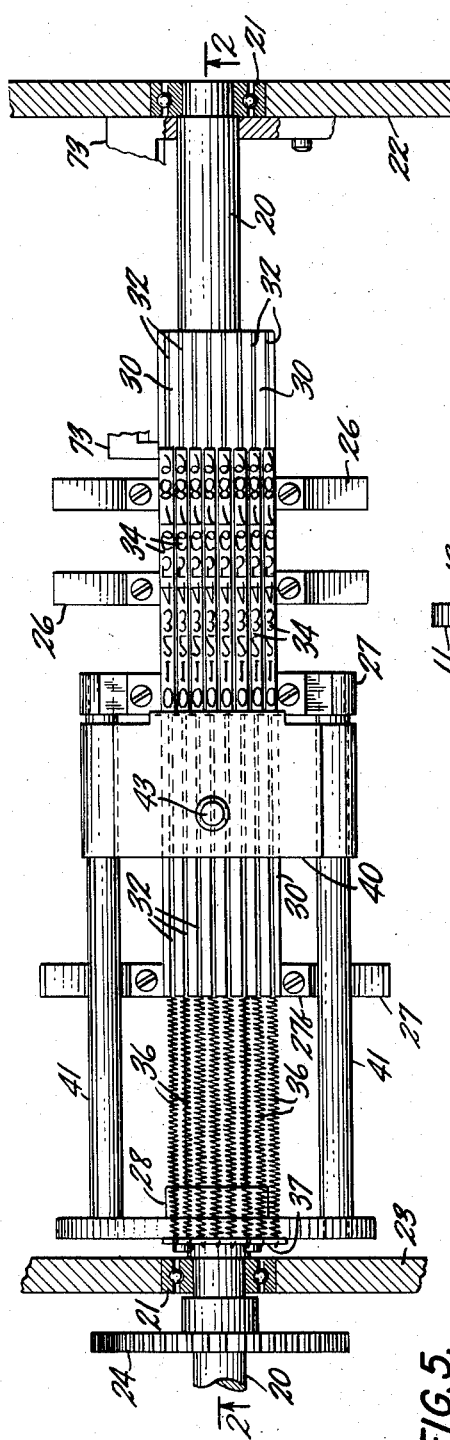
Figure 2:
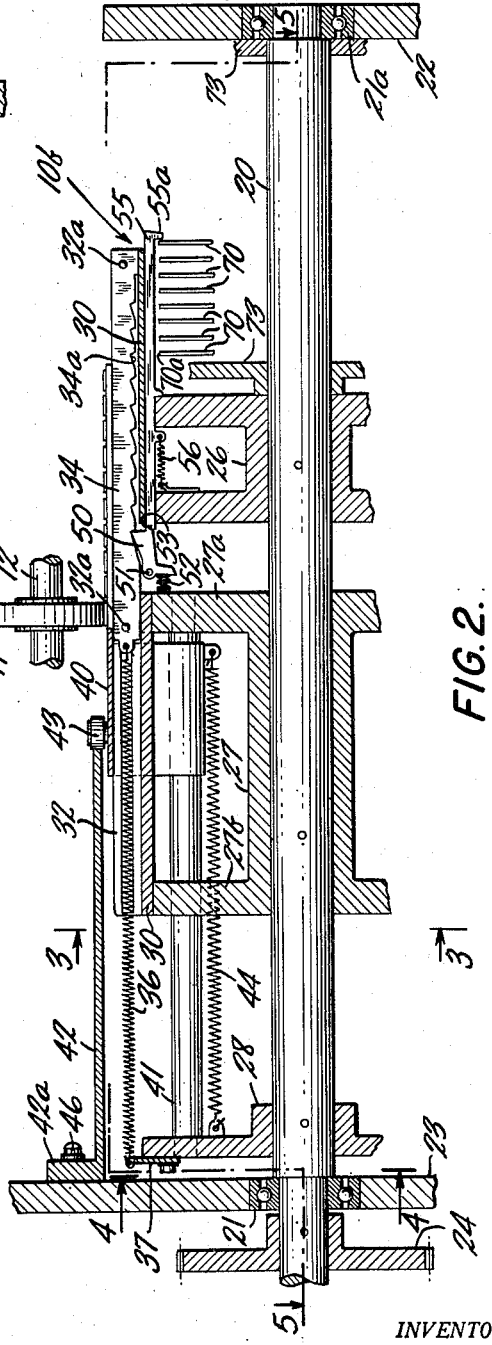
Figure 2 is a radial cross-section view taken through the rotary assembly; it is taken substantially along the line 2—2 of Figure 5 looking in the direction of the arrows.
Figure 7:
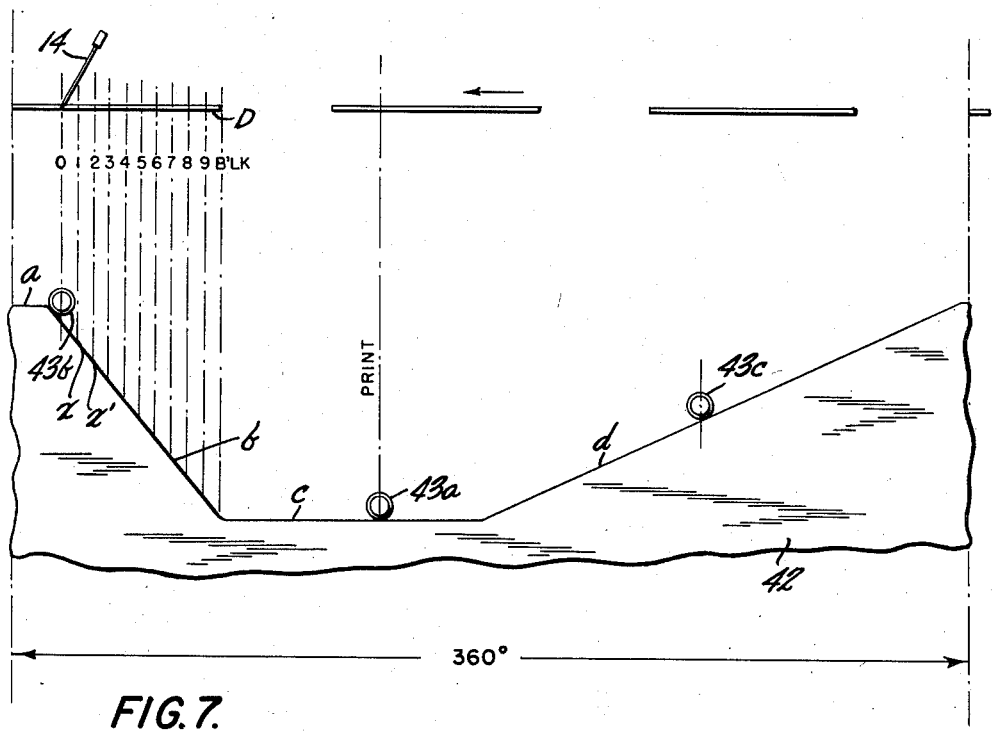
Figure 8:
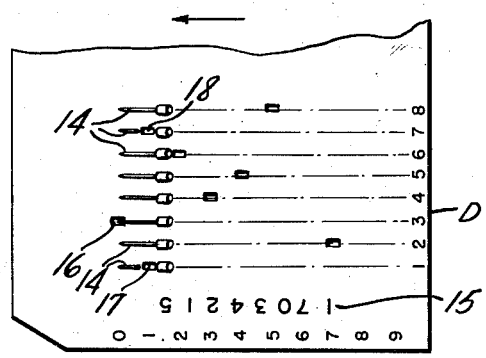

Figures 3, 4 and 5 are cross-section views taken substantially along the lines 3—3, 4—4 and 5—5, respectively, of Figure 2 looking in the direction of the arrows;

Figure 6 is an illustrative view showing the parts which control the movement of the typebars;

Figure 7 is a view similar to Figure 6 illustrating the relative positions of the parts when the rotary assembly carries three printing segments;

Figure 8 is a fragmentary view of a coded record card which controls the interpreting and printing operations in relation to the sensing unit; and Figure 9 is a view taken along the line 9—9 of Figure 1, somewhat enlarged, looking in the direction of the arrows.

Referring to the drawings and particularly to Figure 1, the apparatus of the present invention comprises generally a rotary assembly A which carries three printing segments 10a, 10b and 10c thereon, each segment accommodating a bank of typebars 34 thereon, a sensing unit C for reading information previously recorded in code in a record card D, and an interpreting mechanism E for translating the information read by the sensing unit C into appropriate adjustments of the typebars 34 to set up a line of type which is printed on a card, such as D', fed between the rotary assembly A and an impression roller 11 mounted on the shaft 12. The axis of the shaft 12 can be mounted yieldingly to compensate for various thicknesses of the cards D, D'.

The record control cards D in which the information to be interpreted has been previously coded are advanced one at a time beneath the brushes 14 of the sensing unit C, and each of the brushes 14 of the sensing unit sweeps along a given vertical column of the record card. As shown in Figure 8, the card D comprises at least eight separate vertical columns, which, it will be assumed, embody the information, such as an eight digit identification number represented by the reference numeral 15 in Figure 8, to be printed on the card D'. The brush 14 associated with each column controls the adjustment of a corresponding typebar, and the position of a perforation in each column determines the particular indicia on the typebar to be selected for printing. For example, the card D is shown in Figure 8 in a position relative to the brushes 14 such that the horizontal "0" line in the card is disposed beneath the brushes. In this position of the record card D, the brush sweeping the third column of the card is shown detaching a perforation 16. Consequently, by means to be described in detail below, the typebar associated with the third column of the record card D will be locked in position to print the numeral "0." When the next horizontal line, i. e. the "1" line, passes beneath the brushes 14, the perforations 17 and 18 in the first and seventh columns, respectively, will pass beneath the brushes 14, and the typebars in the first and seventh columns will be locked in operative position to print the numeral "1." With the code perforations indicated in Figure 8, by the time the card D is advanced past the brushes 14 of the sensing unit, the eight typebars of the printing segment operatively disposed in relation to the interpreting mechanism will have been set by the sensing unit C to print the numerals "17034215." The control card D or a different card can then be fed to the position of the card D' to receive this numeral imprinted thereon, as shown at 15.

Referring to Figure 2, the rotary assembly A is supported on a shaft 20, and the ends of the shaft 20 are rotatably supported in bearings 21 of the front and rear frames 22 and 23, respectively, of the machine. The extreme rear end of the shaft 20 carries a spur gear 24 thereon. The spur gear 24 is connected by means of a suitable drive transmission to a drive source (not shown) which rotates the shaft 20 at constant speed.

The rotatable shaft 20 supports thereon a front hub 26, a rear hub 27, and a disk 28 mounted thereon between the rear hub 27 and the rear frame 23. The hub 26 comprises front and rear flanges 26a and 26b, respectively. Also, the hub 27 comprises front and rear flanges 27a and 27b, respectively.

As mentioned above, the rotary assembly A comprises three printing segments 10a, 10b and 10c arranged thereon substantially 120° apart. These printing segments 10a, 10b and 10c are identical so that it is necessary to describe only one in detail. Each of these printing segments carries eight typebars 34 arranged substantially parallel to each other in a fore-and-aft direction. The typebars 34 are supported in guide slots 32 formed in the outer peripheries of comb sectors 30, and the typebars 34 are slidable in fore-and-aft directions in the guide slots. As indicated in Figure 2, the comb sectors 30 may retain rotatable balls 32a in the walls of the slots 32 to facilitate the sliding movement of the typebars within the slots.

In the present embodiment, each of the typebars is of a T-shaped cross-section and has the numerals "0" to "9," inclusive, engraved in raised form on their outer edge. A blank non-printing space may also be provided thereon, if desired. Also, other type characters and indicia may be provided thereon. The narrow or inner edge of the typebars has notches 34a cut therein to permit the typebars to be locked in position to present the selected indicia thereon in alignment with respect to the impression wheel 11, it being understood that the line of type aligned with respect to the impression wheel is in the line of type printed on the card D'.

The typebars are individually urged rearwardly into contact with a slidable bail member 40 by means of tension springs 36 which are connected at one end to the typebars 34 and at the opposite end to a mounting plate 37 (see Figures 2 and 4) mounted to the disk 28.

The typebars 34 of one of the printing segments are adapted to be moved in unison in fore-and-aft directions by mechanism which includes the slidable bail member 40 supported on a pair of fore-and-aft rods 41, one on each side of the printing segment, and a stationary clindrical cam 42 which controls the movement of the slidable bail. The fore-and-aft guide rods 41 which support the slidable bail member 40 thereon extend between the forward flange 27a of the hub 27 and the disk 28. The cylindrical cam 42 is hollow, and it surrounds the rotatable shaft 20 at one end. The extreme rear end of the cam is formed with an outwardly extending flange 42a which is mounted to the rear frame 23 of the machine by means of bolts 46.

The outer surface of the bail member 40 carries a rotatable roller 43 which engages the forward edge of the cam 42, and the roller 43 is maintained in contact with the forward edge of the cam by means of a tension spring 44 connected between the bail member 40 and the disk 28. During a complete cycle of rotation of the rotary assembly A, the roller 43 follows the edges a, b, c and d (see Figure 7) of the cam 42 to control the operation of the bail member 40.

As mentioned above, the slidablbe typebars 34 associated with the printing segment are all urged rearwardly in registered contact with the sliding bail member 40, and, therefore, the typebars will follow the bail member 40 as the position of the latter is determined by the edges a, b, c and d of the cam. In advance of the interpreting and printing portions of the cycle, the bail member 40 is maintained at its forward most position by engagement with the edge a of the cam. At this position the typebars are all maintained at an extreme forwardly position so that the 0's thereof are forward of the impression roller 11.

When the rotary assembly A, however, carries the printing segment to the beginning of the interpreting portion of the cycle of rotation, that is to say, that arc, represented by the reference symbol 80 in Figure 1, in the cycle of rotation of the rotary assembly during which the interpreting mechanism E is operative to set up the typebars to correspond with the information being detected by the sensing unit C, the roller 43 of the sliding bail 40 engages the sloping edge b of the cam 42. The sloping edge b of the cam permits the bail member 40 to move rearwardly, thus moving all of the typebars 34 in unison in a rearwardly direction, until all of the typebars have been locked in the desired position by the release of the spring actuated pivotal latch 50 associated therewith.

The lower or inner edge of each of the typebars 34, as mentioned above, includes a plurality of notches 34a, one corresponding to each of the characters engraved on the typebar, and during the rearward movement of the bank of typebars as controlled by the rearward movement of the sliding bail 40, any of the typebars can be stopped to present any of the indicia thereon in operative position with respect to the impression roller 11 by the release of the spring actuated pivotal latch 50 into engagement with one of these notches. Each of the latches 50 (see Figure 2) is pivotally mounted on a transverse shaft 51, and the latch is urged by a compression spring 52 upwardly into engagement with the notched edge of a typebar 34. The forward edge of each of the typebar latches 50, however, carries a forward projection (see Figure 2) which forms a shoulder 53, and the latch 50 is normally held in a downwardly inoperative position by the engagement of this shoulder with the rearmost extremity of a fore-and-aft slide bar 55.

The slide bars 55 associated with each of the printing segments 10a, 10b and 10c are mounted in guide slots formed by aligned slots in the base of the comb member 30 and in the outer periphery of the hub 26. The slide bar 55 is urged rearwardly by a tension spring 56 (see Figure 2), the rearward end of the slide bar 55 engaging the shoulder 53 of the respective latch and thereby maintaining the pivotal latch 50 out of operative engagement with the respective typebar 34.

Until locked in a given position by the latches 50, the typebars are permitted to retreat rearwardly in a bank in registration with the bail member 40 as the bail member retreats by the engagement of the roller 43 with the sloping edge b of the cam 42. The sliding bail member 40 continues to retreat until the roller 43 engages the low portion c of the cam 42, which edge or surface represents the extreme rearwardly position of the sliding bail member 40. The distance of travel of the sliding bail member 40 while the roller 43 is in engagement with the sloping surface b of the cam 42 is sufficient to move the typebars from one extreme position to another, which distance of travel will permit the displacement of the typebars sufficiently to present all of the indicia thereon in sequence in operative relationship to the impression roller 11.

While the typebars 34 are thus moved rearwardly, the record card D containing the information in code therein is advanced past the sensing unit C. The relationship of the linear travel of the rotary assembly A and the feed of the record card is such that the record card will advance relative to the brushes 14 from one horizontal line to the next while the typebars 34 are moved rearwardly the distance between successive indicia thereon. As mentioned above, there is one brush 14 associated with each column of the record card D, and there is one column for each typebar 34 in the printing segment. Thus, as soon as the brush 14 associated with a particular typebar detects a perforation in the card, the latch 50 associated with that typebar will be released by the forward movement of the respective slide bar 55, and the latch 50 will be urged upwardly by the compression spring 52 into engagement with a notch 34a of the typebar. When the latch 50 engages the notch, the typebar is locked, preventing further rearward travel of the typebar, notwithstanding the fact that the sliding bail member 40 may continue to retreat.

Thus, while the roller 43 of the sliding bail member 40 is in contact with the sloping surface b of the cam 42, all of the typebars 34 will be locked in a printing position, it being understood that a line of selected digits or other indicia of the typebars will be aligned with respect to the impression roller 11. This line of type is also aligned with an inking roller 60 (see Figure 1) which inks the line of type. The ink impressions of these selected digits of the typebars are printed upon a card D' advanced across a platform P between the rotary assembly A and the impression roller 11. It is, of course, evident that the record card D may be advanced from the sensing unit C to the rotary assembly A to receive these ink impressions, or a separate card D' may be fed to the rotary assembly A to receive the ink impressions of the typebars.

The inking unit F, best shown in Figure 1, comprises the inking roller 60, an ink trough 67 and a transfer roller 66. The roller 60 is rotatably supported by one or more levers 61 pivotally mounted on a shaft 62 extending between the front and rear frames of the machine. A tension spring 64 maintains the lever 61 in its extreme counterclockwise position, which position is determined by the engagement of the lower end of the lever 61 with the set screw 63. When, however, the typebars 34 come into contact with the inking wheel 60, the lever 61 is pivoted in a clockwise position so that the wheel 60 engages the transfer roller 66 partly immersed in the inking trough 67. Ink is thereby transferred from the trough 67 via the roller 66 to the ink roller 60 which is in rolling contact with the line of selected type characters.

We turn now to a description of the interpreting mechanism E. As mentioned above, a selected typebar 34 of a printing segment is locked in operative position by a latch 50 released by the forward movement of one of the slide bars 55. The slide bars 55 are, in turn, actuated by pivotal release elements 70, each having an operative arcuately curved edge 70a. The forward ends of the slide bars 55 are provided with inward projections 55a which, when the rotatable printing segment is operatively disposed with respect to the stationary interpreting mechanism E, are each disposed immediately forward of the curved operative edges 70a of different release elements 70. The release elements 70 in their normal inoperative positions are substantially parallel to each other and are spaced apart. Furthermore, the projections 55a of the slide bars of each printing segment are spaced apart and indexed before they come into operative relationship with respect to the release elements 70, so that the projections 55a are each able to enter a space between adjacent release elements 70 and be disposed immediately forward of the release element by means of which it is adapted to be actuated.

As best shown in Figures 1 and 9, the release elements 70 are each pivotally mounted on separate shafts 71 mounted in a stationary frame 73. As best shown in Figure 9, the forward end of the stationary frame 73 is mounted to the rear face of the front frame 22 of the machine. The frame 73, therefore, is stationary and in fixed relationship with the cam 42, so that the slide bars 55 will be in operative relationship with respect to the release elements 70 while the movement of the typebars 34 is controlled by the edge b of the cam. The curved edges 70a of the pivotal release elements 70 afford ideal actuating members for the slide bars 55 in that they maintain an operative position with respect to the slide bars 55 throughout the arc represented by the reference numeral 80.

Each of the pivotal release elements 70 is adapted to be actuated by an electromagnet 85, and each of the electromagnets is, in turn, energized by an electrical circuit completed by the contact between a corresponding brush 14 of the sensing unit C with the platform P. There is a brush 14 associated with each of the electromagnets 85, and when that brush encounters a perforation in the record card D the related electromagnet is energized.

The electromagnets 85 are arranged in two banks of four, and they are supported by the frame 73. The electromagnets are each connected to one of the release elements 70 by a slide 81, and the slides 81 are guided by a slotted comb member 82 attached to the frame 73. The comb member 82 contains a large central opening to permit the rotatable shaft 20 to pass freely therethrough. The forward end of each of the slides 81 is connected to an armature 84 of one of the electromagnets 85. The armatures 84 are pivotally mounted at 86, and the extreme lower end of each is attached to a spring 87 which normally urges the armature 84 in an inoperative or counterclockwise position, as viewed in Figure 9. The slides 81, therefore, normally are maintained in a rearwardly position determined by the engagement of a projection 81a formed thereon with the frame member 73.

The slides 81 pass through aligned slots in the release elements 70. Each of the slides 81 is provided with a pair of downwardly projecting ears 81b, one on each side of the pivotal release element 70 which it is adapted to actuate, which extend below the lower end of the notch formed therein. Thus, the energization of one of the electromagnets will displace the respective slide. This displacement of the slide, in turn, pivotally actuates one of the release elements 70 into contact with the projection 55a of the respective slide bar 55, and this operation, as explained above, releases the latch 50 to lock the corresponding typebar in position to print the desired type character thereon.

Summarizing the operation of the present invention as thus far described, the control card D is fed beneath the brushes 14 of the sensing unit C while the typebars of one of the printing segments are in operative relationship with respect to the release elements of the interpreting mechanism E. As the card is scanned line by line by the brushes 14, the movement of the bail 40 as controlled by the edge b of the cam 42 permits the typebars 34 to move in timed relationship therewith. The detection of a perforation in the card by any one of the brushes will energize one of the electromagnets 85, and the pivotal movement of the operation of the armature of the electromagnet will shift the slide 81 associated with the electromagnet, pivoting one of the release elements 70 about its pivot shaft 71. This pivotal operation of the release element 70 will engage the projection 55a of one of the slide bars 55, sliding it forwardly to release the latch 50. The latch 50 engages one of the notches 34a formed in the typebar, determined by the displacement of the typebar from its start position, to lock it in operative position. When all of the typebars of a printing segment are locked in operative position, a line of type is set up for printing, and this line of type is inked by the roller 60 and then printed on the card D'.

After the printing operation, the slidable bail member 40 is advanced by the engagement of the roller 43 thereof with the surface $d$ of the cam 42. This forward movement of the slidable bail member 40 will return all of the typebars 34 to their starting reference position, that is to say, forward of their "0" position, before the printing segment comes into operative relationship with the interpreting mechanism E during the succeeding cycle of operation. During the resetting of the typebars to their initial position by the return movement of the bail member 40, the latches 50 are in slipping engagement with the notched edges of the typebars, and the typebars are reset with the shoulders 53 thereof locked beneath the slide bars 55 by the camming action of the portions of the lower edges of the typebars rearwardly (or to the left, as viewed in Fig. 2) of the first notches therein.

Figure 7 illustrates the relative positions of the rollers 43 of the sliding bail members 40 associated with each of the printing segments 10a, 10b and 10c when the printing segment 10a is at the printing position. The roller 43a represents the roller of the bail member carried by the printing segment 10a, 43b represents the roller of the bail member associated with the segment 10b, and 43c represents roller of the bail member associated with the segment 10c. At the positions indicated in that figure, the roller 43b is just beginning its rearward movement in contact with the edge $b$ of the cam 42 and the roller 43c is in contact with the edge $d$ of the cam 42, thereby resetting the typebars 34 to their initial positions.

The relationship of the linear movement of the control card D past the brushes 14 and the linear movement of roller 43b along the cam edge $b$ is also shown in Figure 7. As explained above, if any of the brushes 14 engages a perforation at the "0" line of the card, the respective typebars 34 will be immediately locked against rearward travel with the "0" in operative position for printing. The card D is fed at a fixed speed in relation to the travel of the roller 43b along the surface $b$ of the cam 42, so that when sliding bail member 40 is in the position indicated by the reference point $x$ in Figure 7, the control card will have advanced to the "1" line thereon and the typebars will have been moved to present the numeral "1" in the operative position for printing. If, therefore, any of the brushes 14 encounters a perforation in the card, the corresponding typebars will be locked in position to print the numeral "1." Similarly, if any of the brushes encounters a perforation in the control card when the roller 43b is at the point $x'$, the corresponding typebars will be locked in position to print the numeral "2," etc., until each of the typebars is locked in the desired adjusted position to set up a line of type.

The invention has been shown in a single preferred form and by way of example only, and obviously many modifications and variations may be made therein without departing from the spirit of the invention. For example, it is evident that any indicia and any number thereof may be carried by the typebars, including blank or non-printing spaces. The invention, therefore, is not to be limited to any specified form or embodiment except in so far as such limitations are set forth in the claims.

We claim:

1. In an apparatus for printing on a carrier selected indicia which corresponds to information in a coded carrier, a continuously driven rotary assembly, a plurality of typebars carried thereby in an orbital path past a printing position, each of said typebars having assorted indicia formed thereon, a sensing means independent of said rotary assembly for reading information in a coded carrier, means for initiating movement of a typebar at a predetermined point during the cycle of rotation of the rotary assembly, and means controlled by the information read by the sensing means for stopping the movement of the typebar at a predetermined point during the cycle of rotation of the rotary assembly, whereby the interval between said points determines the indicia on the typebar selected for printing.

2. An apparatus as set forth in claim 1 wherein said means controlled by the sensing means includes a plurality of actuating members independent of the rotary assembly, and a plurality of companion members carried by the rotary assembly, at least one of said groups of actuating members being extended for a predetermined arc to maintain the operative relationship therebetween for a predetermined portion of the cycle of rotation of the rotary assembly.

3. In an apparatus for printing on a carrier selected indicia which corresponds to information in a coded carrier, a continuously driven rotary assembly, a plurality of typebars carried by the rotary assembly in an orbital path past a printing position, each of said typebars having assorted indicia thereon, means operative during a predetermined portion of said cycle of rotation of the rotary assembly for moving the typebars from a reference position, means associated with each typebar for locking the typebar in a selected position, sensing means for reading the information in a coded carrier, and means controlled by said sensing means and operatively coupled with the typebars throughout said predetermined portion of the cycle of rotation of the rotary assembly for selectively actuating the typebar locking means after predetermined movements of the typebars from reference positions, thereby locking the typebars in positions to print selected indicia thereof.

4. In an apparatus for printing on a carrier indicia which correspond to information in a coded carrier, a rotary assembly, a plurality of typebars carried by the rotary assembly in an orbital path past a printing position, each of said typebars having assorted indicia thereon, means for initiating movement of said typebars in unison from a reference position at a predetermined point in the cycle of rotation of the rotary assembly and for continuing the movement for a predetermined portion of the cycle of rotation intermediate the predetermined point and the printing position, means for locking each typebar in a selected position, means for actuating said typebar locking means, said means being mounted independently of the rotary assembly and being in operative relationship with the typebar locking means throughout said predetermined portion of the cycle of rotation of the rotary assembly, sensing means for reading the information in a coded carrier, means for feeding the coded carrier relative to the sensing means in timed relationship with the movement of the typebars from the reference position, and means controlled by the sensing means for operating the means for actuating the typebar locking means to adjust the typebars to positions to print selected indicia thereof.

5. In an apparatus for printing on a carrier indicia which correspond to information in a coded carrier, a rotary assembly, a type carrier mounted in said rotary assembly having assorted type characters thereon, means operative during a predetermined portion of said cycle of rotation of the rotary assembly for moving the type carrier from a reference position, means for locking the type carrier in a fixed position, first actuating means carried by said rotary assembly for controlling the operation of said locking means, second actuating means mounted independently of the rotary assembly for controlling the operation of said first actuating means, one of said actuating means including an arcuately extending portion which is in operative relationship with respect to said locking means during said predetermined portion of the cycle of rotation of the rotary assembly, and means operative under the control of a coded carrier to operate the second actuating means in timed relation to the movement of the type carrier from the reference position, thereby locking the type carrier in position to print a selected character thereof.

6. An apparatus as set forth in claim 5 including feed means for advancing the coded carrier relative to the sensing means in timed relation to the movement of the type carrier from the reference position.

7. In an apparatus for printing on a carrier indicia which correspond to information on a coded carrier, a plurality of adjustable typebars, each of said typebars having assorted type characters thereon, means for biasing said typebars for movement in one direction, cam means mounted for relative movement with respect to said typebars for controlling the movement of said typebars under the influence of said biasing means, said cam means including a portion thereof for maintaining said typebars in a reference position and a portion thereof for permitting movement of said typebars from said reference position, typebar locking means associated with each of the typebars operable to lock the typebar in a predetermined position to select characters thereon for printing, and means controlled by the coded carrier for actuating selectively said typebar locking means at predetermined relative positions of said typebars and said cam means to set up a line of type on said typebars.

8. In an apparatus for printing on a carrier indicia corresponding to information on a coded carrier, a rotary assembly, a plurality of adjustable typebars carried by said rotary assembly, each of said typebars having assorted type characters thereon, cam means mounted for relative movement with respect to the rotary assembly, means for urging the typebars into a position determined by said cam means, said cam means including a portion thereof for maintaining each of said typebars in a reference position and a portion thereof for permitting movement of the typebars from said reference position, locking means associated with each of said typebars for locking them in an adjusted position, and means controlled by the coded carrier for rendering said locking means operative at predetermined relative positions of said rotary assembly and said cam means to set up a line of type on said typebars.

9. A machine as set forth in claim 8 wherein the cam means includes a portion thereof for restoring the typebars to said reference position.

10. In an apparatus for printing on a carrier selected indicia which correspond to information in a coded carrier, a frame, a rotary assembly mounted in said frame, a plurality of spring urged typebars movably mounted in the rotary assembly, each of said typebars having a plurality of type characters spaced apart thereon, typebar registering means, cam means mounted independently of the rotary assembly for moving said typebar registering means, whereby during a predetermined portion of the cycle of rotation of the typebars the typebars will be permitted to move in unison from a reference position to a position of maximum displacement, locking means associated with each of the typebars, and means controlled by a coded carrier for actuating selectively said locking means at predetermined positions intermediate said reference position and said position of maximum displacement, thereby setting up a line of type to be printed.

11. In an apparatus for printing on a carrier selected indicia which correspond to information in a coded carrier, a frame, a rotary assembly mounted in said frame, a plurality of notched typebars movably mounted in said rotary assembly, each of said typebars having a plurality of type characters spaced thereon and a notch therein corresponding to each of said characters, means for biasing said typebars for movement in one direction, a cam mounted to said frame for controlling the movement of said typebars under the influence of said biasing means, said cam during the rotation of said rotary assembly maintaining said typebars in a reference position during a portion of the cycle of rotation of the rotary assembly and permitting movement of said typebars in unison from said reference position to a displaced position during another portion of said cycle of rotation of the rotary assembly, a pivotal latch member associated with each typebar, a bank of release elements mounted in said frame, the release elements being in operative relationship with the latch members during that portion of the cycle of rotation of the rotary assembly during which the typebars are movable in unison by said cam from said reference position to a displaced position, and means controlled by a coded carrier for selectively operating said release elements, thereby separately releasing each of said latch members in timed relationship to the movement of said typebars from said reference position, the engagement of said latch members with said notched typebars locking the typebars in position to print a line of type.

12. The apparatus as set forth in claim 11 wherein the release elements are formed with an operative curved portion to maintain said operative relationship with a companion latch member for a predetermined portion of the cycle of rotation of the rotary assembly.

13. The apparatus as set forth in claim 11 including an ink roller for inking the line of type characters set up on the typebars.

14. The apparatus as set forth in claim 11 including means for restoring all of said typebars to the reference position after the printing operation.

15. The apparatus as set forth in claim 11 including a plurality of printing segments carried by the rotary assembly, each printing segment carrying a plurality of adjustable typebars thereon, and wherein the latch members of each segment are translated in an orbital path relative to a common bank of releasing elements.

16. In an apparatus for printing on a carrier selected indicia which correspond to information in a coded carrier, a frame, a rotary assembly mounted in said frame, a plurality of printing segments carried by said rotary assembly, a plurality of notched typebars adjustably mounted in each printing segment, each of said typebars having a plurality of type characters spaced thereon and a notch therein corresponding to each of said characters, a cam mounted to said frame and surrounding the axis of rotation of the rotary assembly, a bail member slidably mounted on each of said printing segments, the position of said slidable bail member being controlled by the cam, means for urging each of the typebars of the printing segment into engagement with said bail member, said cam including a portion for maintaining said typebars in a reference position, a portion for moving the typebars in unison from said reference position to another position and a portion for returning the typebars to said reference position, a pivotal latch member associated with each typebar, a spring urged slide mounted within said printing segment and associated with each latch member, said slide being urged into engagement with said latch member to maintain it in inoperative position, a bank of release elements mounted in said frame, the release elements and the slides of a given segment being in operative relationship throughout that portion of the cycle of rotation of the rotary assembly during which the typebars are movable in unison from said reference position, the operation of one of said release elements moving a slide in operative relationship therewith to release a corresponding latch, permitting said released latch to engage one of the notches of a typebar, thereby locking the typebar in position to print a selected character thereon, and means controlled by a coded carrier for selectively operating said release elements.

17. The apparatus set forth in claim 16 wherein said means controlled by a coded carrier for selectively operating said release elements includes a bank of electromagnets.

18. The apparatus set forth in claim 16 wherein said means controlled by a coded carried for selectively operating said release elements includes sensing means and feed means for advancing the coded carrier relative to the sensing means in timed relationship to the movement of said typebars from said reference position.

References Cited in the file of this patent

UNITED STATES PATENTS

| Number | Name | Date |
|---|---|---|
| 1,608,837 | Bryce | Nov. 30, 1926 |
| 1,726,539 | Carroll | Sept. 3, 1929 |
| 1,791,451 | Kohler | Feb. 3, 1931 |
| 1,791,753 | Cunningham | Feb. 10, 1931 |
| 1,798,328 | Kohler | Mar. 31, 1931 |
| 1,896,538 | Bryce | Feb. 7, 1933 |
| 2,005,038 | Kalman | June 18, 1935 |
| 2,695,558 | Paris | Nov. 30, 1954 |

U. S. DEPARTMENT OF COMMERCE
PATENT OFFICE

CERTIFICATE OF CORRECTION

Patent No. 2,821,908 February 4, 1958

Fred B. Porterfield et al.

It is hereby certified that error appears in the printed specification of the above numbered patent requiring correction and that the said Letters Patent should read as corrected below.

Column 2, line 63, for "posittion" read --position --; line 70, for "detaching" read -- detecting --; column 3, line 52, strike out "in"; line 63, for "clindrical" read -- cylindrical --; column 4, line 6, for "slidablbe" read -- slidable --; column 10, line 75, for "carried" read -- carrier --.

Signed and sealed this 1st day of April 1958.

(SEAL)

Attest:

KARL H. AXLINE
Attesting Officer

ROBERT C. WATSON
Commissioner of Patents